United States Patent
Case

(10) Patent No.: US 8,437,499 B2
(45) Date of Patent: May 7, 2013

(54) PREEMPTIVE CHANGE VERIFICATION VIA ELECTRONIC SIGNATURES IN INDUSTRIAL AUTOMATION SYSTEMS

(75) Inventor: Clark L. Case, Phoenix, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 125 days.

(21) Appl. No.: 13/230,802

(22) Filed: Sep. 12, 2011

(65) Prior Publication Data

US 2012/0016500 A1 Jan. 19, 2012

Related U.S. Application Data

(63) Continuation of application No. 10/952,990, filed on Sep. 29, 2004, now Pat. No. 8,031,913.

(51) Int. Cl.
*G06K 9/00* (2006.01)

(52) U.S. Cl.
USPC .............. 382/100; 713/176; 707/687; 705/1.1

(58) Field of Classification Search .................. 382/100, 382/116, 141; 713/176; 726/11; 707/687; 705/1.1, 50
See application file for complete search history.

(56) References Cited

U.S. PATENT DOCUMENTS

| | | | |
|---|---|---|---|
| 6,581,020 B1 | 6/2003 | Buote et al. | |
| 6,681,198 B2 | 1/2004 | Buote et al. | |
| 6,754,874 B1 | 6/2004 | Richman | |
| 7,092,839 B2 | 8/2006 | Buote et al. | |
| 7,435,581 B2 | 10/2008 | West | |
| 2003/0103672 A1 | 6/2003 | Lapstun et al. | |
| 2004/0064253 A1 | 4/2004 | Brayton et al. | |
| 2004/0117624 A1 | 6/2004 | Brandt | |

FOREIGN PATENT DOCUMENTS

WO 03025880 A1 3/2003

OTHER PUBLICATIONS

Sasha V. Ilyukhin, Timothy A. Haley, and John W. Larkin, Control System Validation: Key to Automated Food Processing, Food Technology, Mar. 2000, vol. 54, No. 3 pp. 66-72.
David Deitz, Addressing 21 CFR Part 11 Requirements with an Automated Configuration Audit Trial and Version Management System. The Official Journal of ISPE, Mar./Apr. 2001, vol. 21 No. 2.
OA dated Jun. 13, 2008 for U.S. Appl. No. 10/952,990, 30 pages.
OA dated Dec. 12, 2008 for U.S. Appl. No. 10/952,990, 19 pages.
OA dated Mar. 30, 2009 for U.S. Appl. No. 10/952,990, 17 pages.
OA dated Nov. 27, 2009 for U.S. Appl. No. 10/952,990, 25 pages.
OA dated May 12, 2010 for U.S. Appl. No. 10/952,990, 22 pages.
OA dated Dec. 9, 2010 for U.S. Appl. No. 10/952,990, 81 pages.

*Primary Examiner* — Anand Bhatnagar
(74) *Attorney, Agent, or Firm* — Alexander R. Kuszewski; Turocy & Watson, LLP; John M. Miller

(57) ABSTRACT

The subject invention relates to a system and methodology facilitating automated manufacturing processes in a regulated industrial controller environment. In one aspect, a system for automated industrial processing is provided. The system includes an interface component to facilitate processing of one or more electronic signature components and a verification component that operates with the interface components and the electronic signature components to validate requested or proposed process changes before actual system implementation of the process changes.

26 Claims, 8 Drawing Sheets

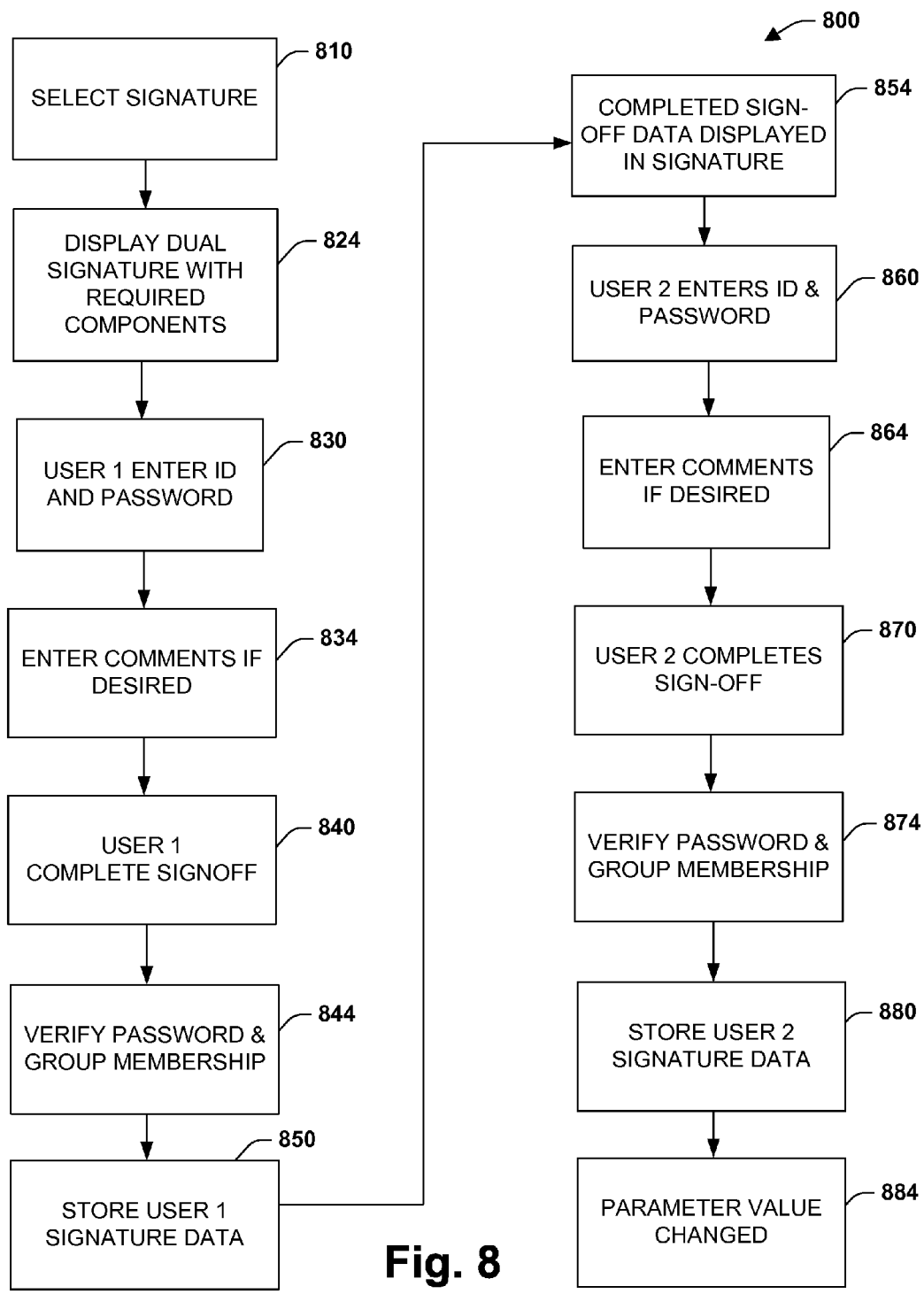

PREEMPTIVE CHANGE VERIFICATION VIA ELECTRONIC SIGNATURES IN INDUSTRIAL AUTOMATION SYSTEMS

CROSS-REFERENCE TO RELATED APPLICATION

This application is a continuation of U.S. application Ser. No. 10/952,990, filed Sep. 29, 2004, and entitled "PREEMPTIVE CHANGE VERIFICATION VIA ELECTRONIC SIGNATURES IN INDUSTRIAL AUTOMATION SYSTEMS", the entirety of which is incorporated herein by reference.

TECHNICAL FIELD

The subject invention relates generally to industrial control systems, and more particularly to a system and methodology that enables industrial automation equipment to be regulated according to applicable standards via the employment of electronic signatures that employs signature validation procedures before allowing actual process changes.

BACKGROUND OF THE INVENTION

Industrial controllers are special-purpose computers utilized for controlling industrial processes, manufacturing equipment, and other factory automation, such as data collection or networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often such as in the case of automobiles, complex assemblies can be manufactured with high technology robotics assisting the industrial control process.

In many automated processes, including the basic production of commodities such as food, beverages, and pharmaceuticals, complex state logic is often designed and programmed by Systems Engineers or provided in some cases by automated equipment manufacturers. This logic is often programmed with common PLC ladder logic or higher level languages supported by Sequential Function Charts. Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

In modern systems, many layers of regulation are now being imposed on automated industries to ensure compliance to applicable standards. To document that these requirements are being adhered to, often one or more signatures are required which in some systems may be more than merely signing a journal record or document but, in increasing circumstances these procedures have become electronic. For instance, if a customer in an FDA regulated industry desires to use electronic signatures in place of handwritten signatures, they must do so in accordance with 21 CFR Part 11. In some existing systems, electronic signatures are only offered in association with report parameter verification in procedural phases, verification of procedural steps, and confirmation of batch and phase commands. However, these signatures may be lacking several key features required under 21 CFR Part 11. For example, the meanings of the signatures are not presented to the signers nor recorded, and in some electronic event journals it may be difficult or impossible to determine if an electronic signature was properly obtained or not.

Some of the notable aspects of 21 CFR Part 11 include:
(a) Signed electronic records shall contain information associated with the signing that clearly indicates all of the following:
  (1) The printed name of the signer;
  (2) The date and time when the signature was executed; and
  (3) The meaning (such as review, approval, responsibility, or authorship) associated with the signature.
(b) The items identified in paragraphs (a)(1), (a)(2), and (a)(3) of this section shall be subject to the same controls as for electronic records and shall be included as part of any human readable form of the electronic record (such as electronic display or printout).

In addition to the components mentioned above, customer requirements include the ability to specify one or more signers for each signature, to specify security requirements for each signer, and to specify a comment requirement for each signer.

Journaling requirements are further described in the following 21 CFR Part 11 excerpt:

"Electronic signatures and handwritten signatures executed to electronic records shall be linked to their respective electronic records to ensure that the signatures cannot be excised, copied, or otherwise transferred to falsify and electronic record by ordinary means."

In view of the above, many modern industrial automation systems are not equipped to process, record, and document required signature activities. For instance, in a typical factory setting, process steps and operator actions requiring possible signature authentication are highly distributed throughout various locations in the factories. Attempting to manage such activities from various locations can be a challenge even for the most sophisticated of automation systems. Also, some systems providing crude attempts at signature verification may allow certain activities to occur such as alteration of a system parameter before the actual authentication of the signature has occurred.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to a system and methodology to automatically manage and control electronic signature activities in accordance with a distributed industrial control system. This includes preemptively verifying operator activities at various locations that require electronic signatures before actual implementation of the required change in the system. For instance, an operator may request a change with a process parameter or variable from some remote location in a factory. The requested change can be transmitted and collected on a centralized server or processor such as a batch server that is employed in conjunction with a control system to produce a recipe. This may then trigger the server to detect that the requested changes requires a valid electronic signature. In accordance with the subject invention, if this type of change or deviation triggered full signature authentication between the operator (or operators) and the remote server, then valid verification and authorization processing would occur between one or more remote locations and the server before actual implementation of the proposed change.

Upon successful entry of the signature and verification thereof, the requested change can then be implemented by the automated system. If successful signature verification or validation does not occur, the proposed change is ignored and a subsequent report or file can be generated. By requiring signature verification and authentication before proposed changes are actually implemented, the subject invention mitigates the possibility that an unregulated change can occur within a process. In an alternative aspect of the subject invention, just-in-time training procedures can be automatically initiated in lieu of or to supplement electronic signatures to facilitate compliance to regulatory controls.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 8 illustrates an example interface for entering phase parameters in accordance with an aspect of the subject invention.

DETAILED DESCRIPTION OF THE INVENTION

The subject invention relates to a system and methodology facilitating automated manufacturing processes in a regulated industrial controller environment. In one aspect, a system for automated industrial processing is provided. The system includes a remote or local interface component to facilitate processing of one or more electronic signature components and a verification component that operates with the interface components and the electronic signature components to validate requested or proposed process changes before actual system implementation of the process changes. By automatically validating signature requirements before actual process changes are implemented, the subject invention facilitates tighter quality controls in view of regulations while mitigating the chances that a change could occur outside of proper signature verification procedures.

It is noted that as used in this application, terms such as "component," "model," "object," "class," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers (e.g., via data packets and signals between the computers), industrial controllers, and/or modules communicating therewith.

Figure 1:
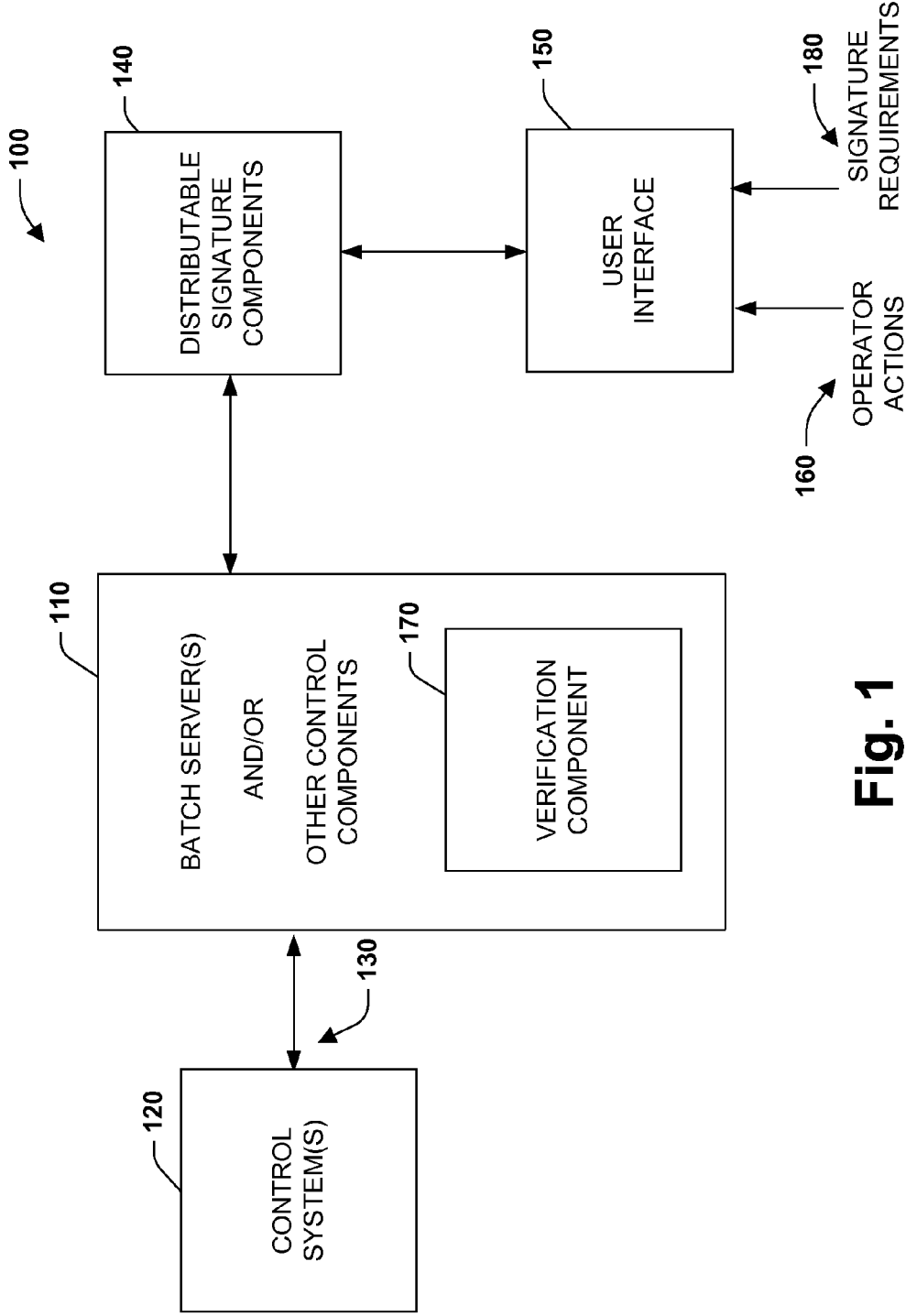
FIG. 1 is a schematic block diagram illustrates a signature processing system in accordance with an aspect of the subject invention.

Referring initially to FIG. 1, a system 100 illustrates signature processing in accordance with an aspect of the subject invention. The system 100 includes a batch server 110 for processing recipes or programs that are employed to manufacture a plurality of differing products in an automated industrial environment. The server 110 generally operates with one or more control systems 120 via network connections 130 (wireless and/or wired) to the server 110. Such network connections can include local factory networks such as ControlNet, DeviceNet or Ethernet and can include communications to remote systems such as over the Internet, for example. The control systems 120 can include programmable logic controllers, I/O modules, communications modules and so forth. In general, an electronic signature (not shown)—relating to a deviation for a process parameter, is generated before the deviated or changed value takes effect. If an operator attempts to change the value of the process parameter, the batch server 110 checks if that new value would cause a deviation. If so, it generates and verifies the type of signature that has been configured (e.g., single signature, dual signature). Then, the user(s) is provided the option of completing the signature or canceling it, if desired. If they complete the signature, the new value takes effect. If they cancel it, the batch server 110 discards the request for change.

In order to facilitate signature processing, one or more distributable signature components 140 are migrated to various locations across the factory. These components can include templates, Application Programming Interfaces (APIs), Schemas, and so forth that drive respective user interface components 150 to interact with various users or operators associated with the control systems 120 and/or batch server 110. The user interface 150 interacts with operators to control a process. At 160, one or more operator actions can be input that may affect operations of the system 100. For instance, an operator may request to change a parameter or system variable. This request is fed back to the server 110, wherein a verification component 170 determines whether or not the changed parameter requires signature verification for such request. These determinations are described in more detail below with respect to FIG. 3 but can include policy or rule determinations and/or limit testing on the changed value.

If the parameter change requires a signature, the batch server 110 initiates a signature verification procedure, wherein the operator (or operators) is required perform one or more signature requirements 180 at the user interface 150. These requirements 180 can include such procedures as entering a user name and password, for example. After entering the signature data, the data is transferred to the server where the data is verified by the verification component 170. When the data has been verified, automated processes occur such updating a regulation record with the operator's electronic signature. After verification, the actual parameter change can be initiated on the batch server 110 and/or control system 120. In this manner, requested changes are first authenticated (if necessary according to system policy), before actually changing the value. Thus, in contrast to conventional systems that may collect signatures to merely record that a change has occurred, the subject invention mitigates having an unregulated change entered by causing the signature verification step to occur before actual implementation of the change. Before proceeding with a discussion of FIG. 2, the following definitions may be employed:

Electronic Signature
An electronic representation of a signature including associated data. These can include one or more signature signoffs. Associated data includes meanings for the signoffs, comments, security requirements, and timestamps described below.

Signoff
A component of an electronic signature in which a user enters his username and password and optionally a comment. An electronic signature can require one or more signoffs.

Signoff Meaning
A short phrase describing the meaning attached to a given signoff. For example, "Done By" or "Checked By".

Signature List
A list of pending signatures and their related commands, report parameters, etc. maintained on the Batch Server.

Signature List UI
User interface for accessing signature.

Signature Template
A collection of data to define a signature—number of signoffs, signoff meanings, signoff security requirements, and signoff comment requirements. Signature templates can be defined centrally, and can be referred to when defining signature requirements.

Cancel a Signature
When a user cancels a signature, this signals the batch system that the signature will not be completed. The Batch system will then let the originator of the signature know that it has been canceled so that it may take appropriate actions. Likely reasons for canceling a signature include incorrect data associated with the signature and the user desiring to prevent a command associated with a signature to complete.

Figure 2:
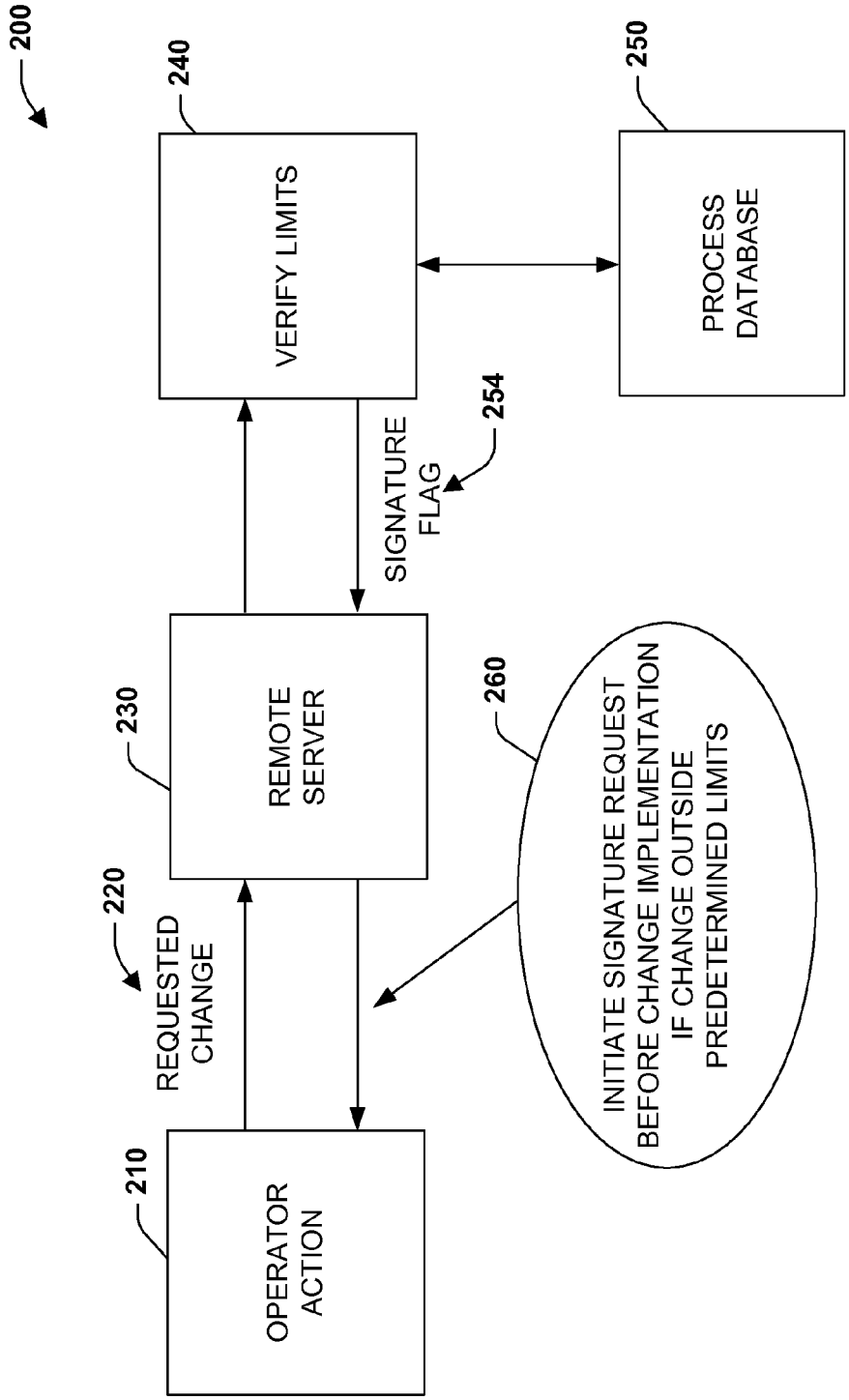
FIG. 2 illustrates a system for parameter change and signature processing in accordance with an aspect of the subject invention.

Referring now to FIG. 2, a system 200 illustrates parameter change and signature processing in accordance with an aspect of the subject invention. At 210, one or more operator actions occur that direct a requested change to a remote or local server 230. In one case the change 220 may not be affected by system policy as requiring a signature thus the change can be implemented within the system. If the change 220, requires a signature, the change can be tested to determine or verify it is within prescribed limits at 240 (e.g., threshold data test), wherein a process database 250 holds policy and/or threshold data to determine whether or not a signature is required before implementation of the requested change 210. If a signature is determined at 240, a signature flag 254 or other data can be sent to the server 230, wherein the server can initiate a signature request at 260 before actually applying the requested change.

It is to be appreciated, that the operator actions 210 can relate to a plurality of differing requests 220 that may require signature validation. These can include parameter changes, variable changes, program changes, process changes and so forth that affect how the system 200 performs. Other actions can include commands such as start, hold, restart, abort, stop, reset, manual, pause, resume, acknowledge, and disconnect, for example. Still yet other commands can include auto, download, semi-auto, add batch, remove batch, step change, clear failures, acquire, release, and bind, for example.

Figure 3:
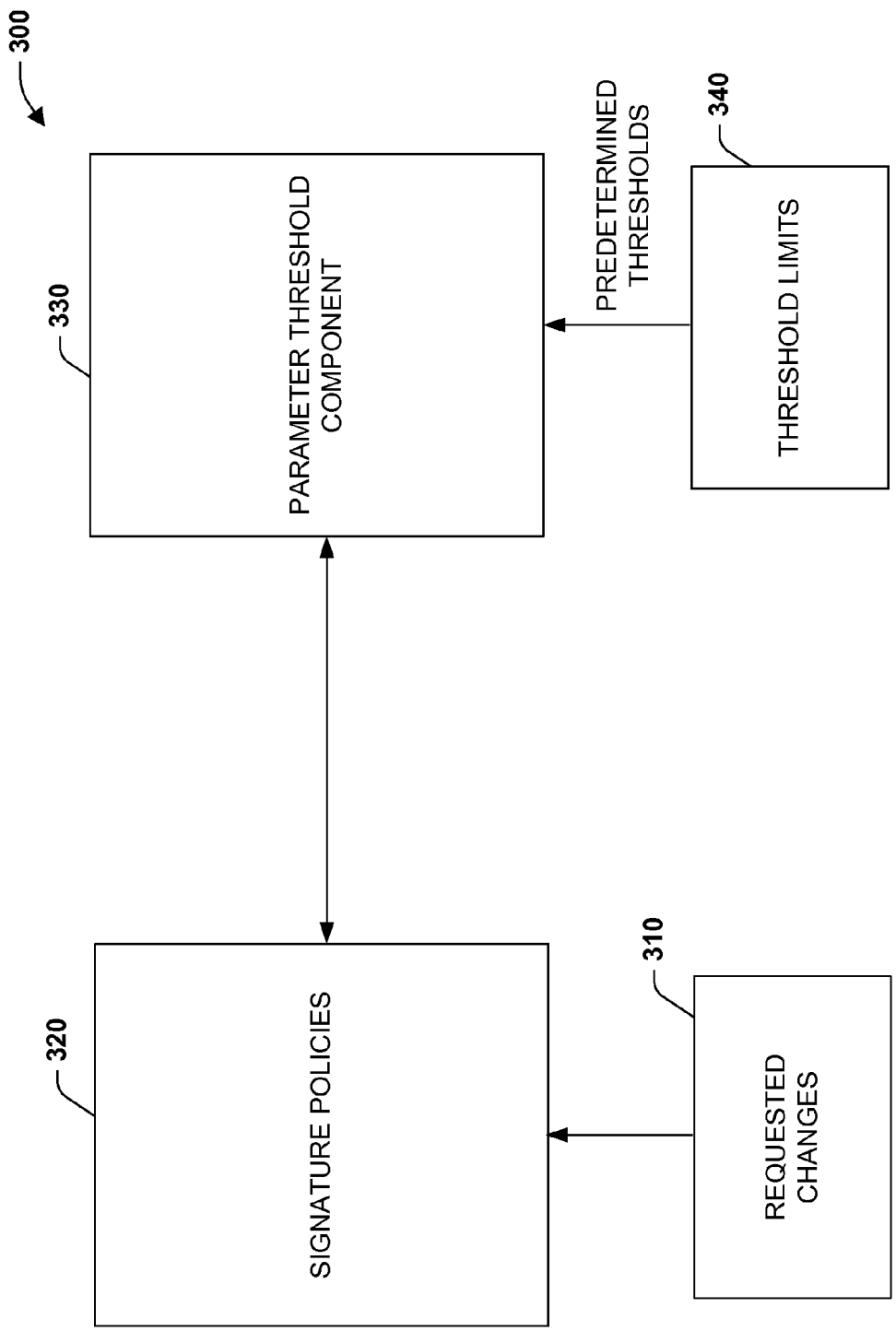
FIG. 3 illustrates policy and limit processing in accordance with an aspect of the subject invention.

FIG. 3 illustrates policy and limit processing for signatures in accordance with an aspect of the subject invention. At 310, one or more requested changes are submitted by one or more operators as described above. A policy component 320 is provided to determine whether or not the proposed change 310 requires signature validation. For instance, one policy may require that any changes to a given recipe's batch components require signatures. In another example, it may be determined that anytime an operator attempts a pause, a resume, or a restart command that no signature is required, while other commands such as start, stop, or abort require a signature validation before allowing the attempted change. If the policy component 320, determines that a signature is required, where applicable a parameter threshold component 330 further analyzes the change request to determine if the request is within an acceptable range or limit. For instance, one or more threshold limits 340 can be stored that describe predetermined threshold to be used for comparison by the parameter threshold component 330. If a proposed change is outside (e.g., above or below) respective threshold limits 340, an automated signature generation procedure can be initiated as previously described. In accordance with the subject invention, signature data would have to be collected from one or more users, validated as correct, and then respective proposed parametric changes could be changed such as at the batch server or at one or more controllers.

Figure 4:
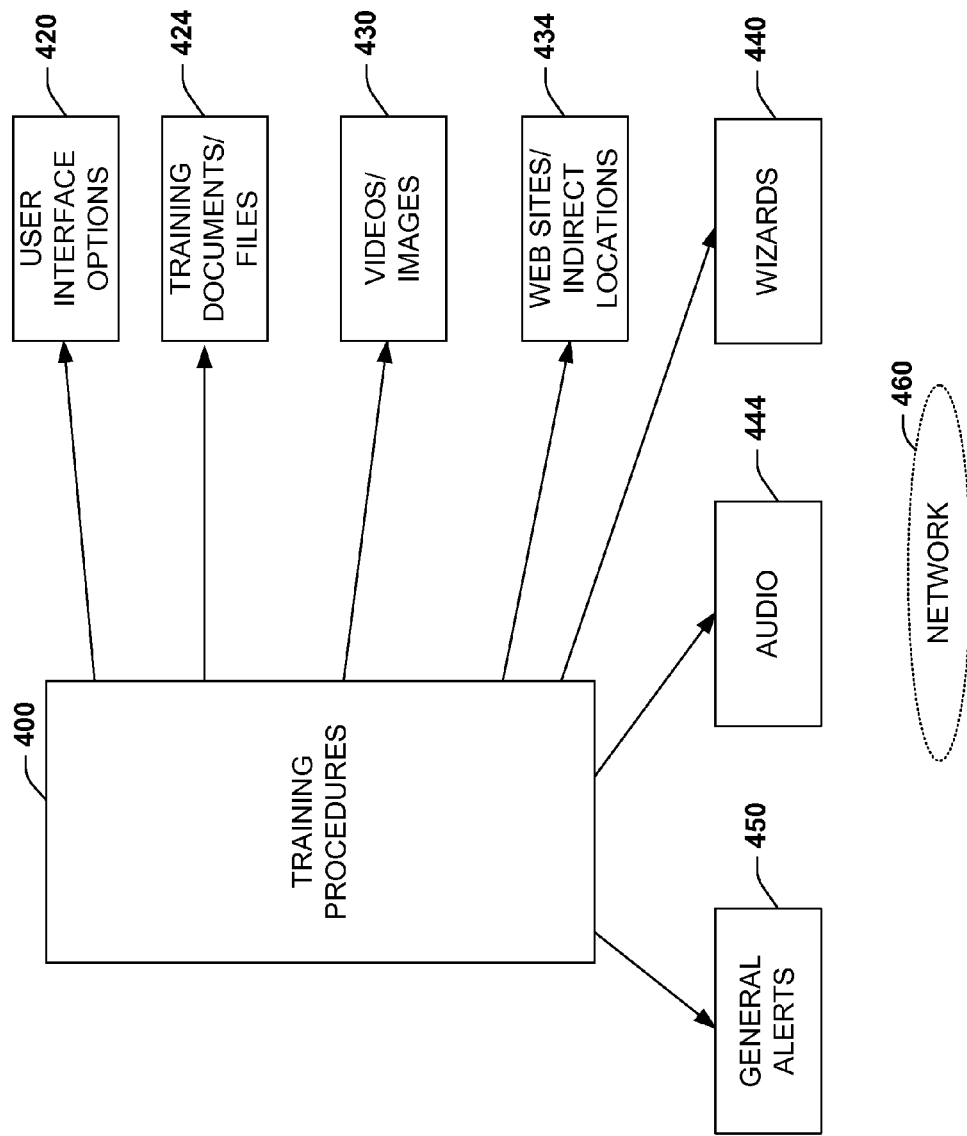
FIG. 4 is a diagram illustrating various automated training procedures in accordance with an aspect of the subject invention.
Figure 5:
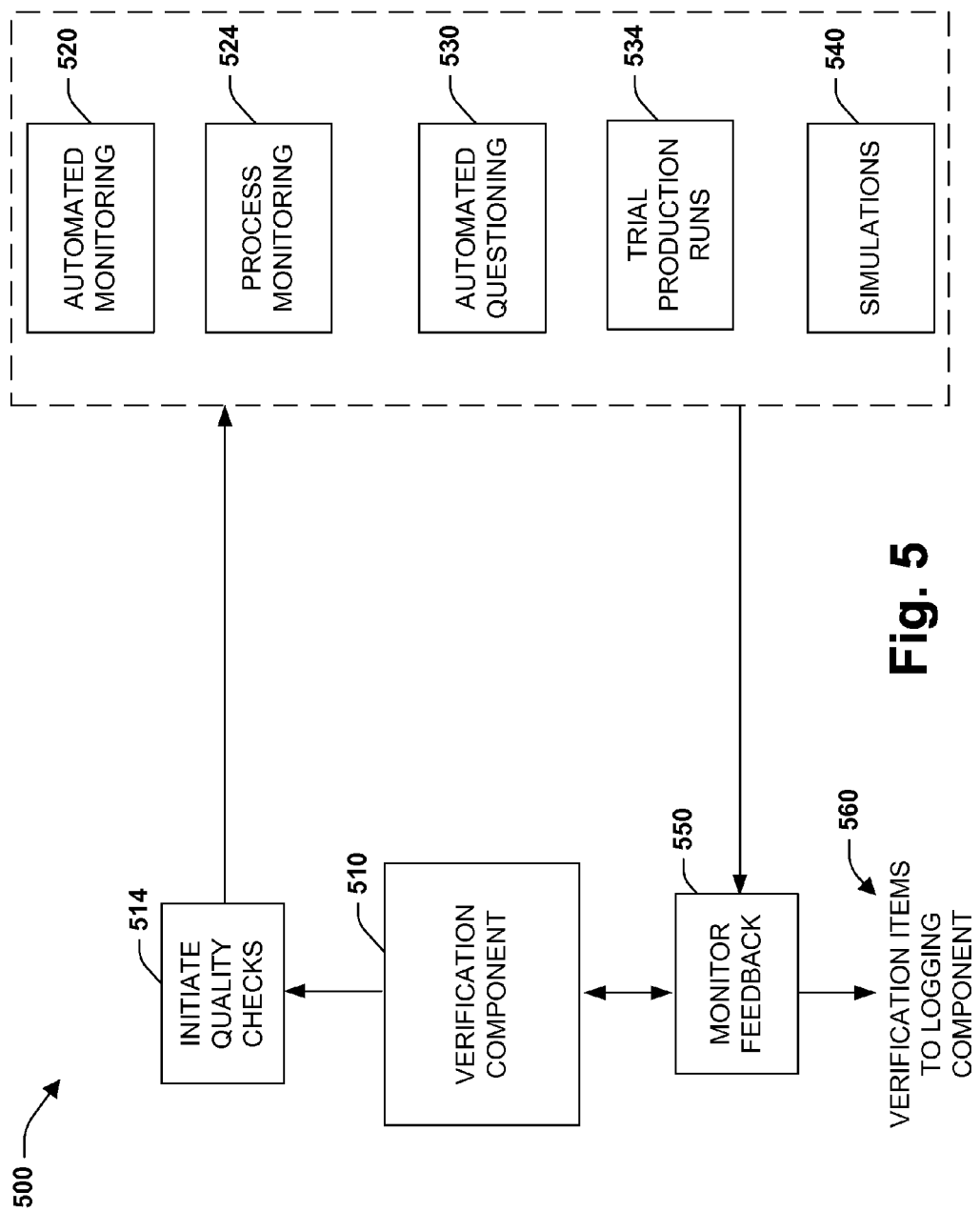
FIG. 5 is a diagram illustrating training verification and feedback in accordance with an aspect of the subject invention.
Figure 6:
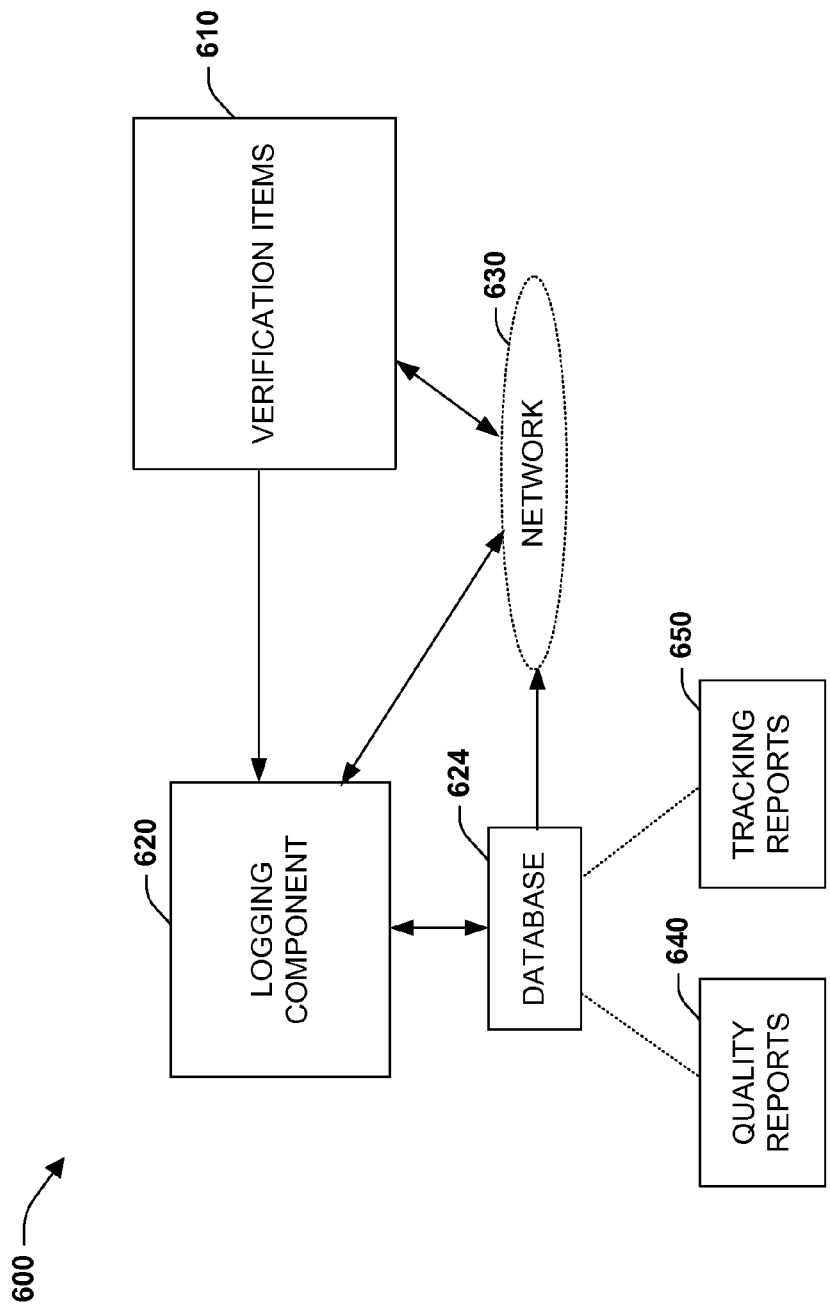
FIG. 6 is a diagram illustrating logging and report generation in accordance with an aspect of the subject invention.

FIGS. 4-6 illustrate an alternative aspect of the subject invention. In these examples, one or more automated training procedures may be invoked when changes are detected with a respective system. Such training can be run in accordance with a signature validation procedure to record the fact that training has been provided and that personal has been adequately trained to be in compliance with applicable regulations. It is noted that the respective training examples depicted in FIGS. 4-6 can be initiated according to various circumstances, wherein some training is invoked as part of a signature procedure and some training can be linked to other events such as execution of a recipe phase or step. For instance, automated training can be invoked as part of a signature validation process—including before, after, or concurrently with signature validation. Referring to FIG. 4, various automated training procedures 400 are illustrated in accordance with an aspect of the present invention. The procedures 400 relate to just-in-time training and can be dynamically provided before, during and/or after selected portions of a batch process, program, signature procedure, and/or recipe. These procedures include providing various user interfaces 420 depending on a detected recipe phase. For example, during one portion of a recipe, routine interfaces for normal operations may be provided. During other portions that trigger automated training, a training interface may be provided. This can include changing all or portions of the interface, highlighting portions of the interface, adding additional input options such as help menus or pop-up windows, and providing other features designed to aid or train the operator in the process at hand.

In another aspect, training procedures can be provided as training text, files or documents at 424 including support for multiple languages. At 430, video files can be provided to guide operators including sequential or static images directing operator instructions such as via JPEG or MPEG files or other format. At 434, the training procedures 400 may include directing the operator to a web site or other source for further instruction (e.g., provide pop-up window with a hyperlink to training website, provide an icon that takes user via a file path to a remote/local database for further instructions). At 440, operators can be exposed to automated training wizards to guide the operator during manufacturing operations. These wizards can be set-up in a substantially sequential format of visual and audio presentations that typically cause the operator to answer questions during the presentation. At 444, various audio training can be provided such as playing an audio file (e.g., wave file) containing verbal instructions to guide or direct the operator.

At 450, generalized training alerts or presentations can also be provided based upon detected circumstances. This can include providing pre- and post process messages over mass communications systems such as loud speakers, e-mail, instant messages, automatic message systems, and so forth (e.g., if a new recipe is to be executed, send instant messages to selected operators and broadcast further training instructions as an event over e-mail to alert or remind different operators of upcoming recipe changes). At 460, the training procedures 400 can be communicated over substantially any communications medium (e.g., wireless, telephone, cable) or network such as local/remote factory (e.g., Ethernet, DeviceNet, ControlNet) and/or public networks such as the Internet. After respective training has been delivered, a signature process can be initiated, wherein an operator confirms that training has been received. Upon verification of the signature, the associated process can be started.

FIG. 5 is a system 500 illustrating training verification and feedback in accordance with an aspect of the present invention. A verification component 510 can be provided with the automated training procedures described above to automatically determine whether or not an operator has adequately received respective training information. This can include dynamically initiating automated quality checks at 514 during or after a training procedure has been launched. In one aspect, the automated quality checks 514 include performing automated background monitoring at 520. Such monitoring 520 can include elaborate systems such as head tracking systems, cameras, and microphones to detect sounds. Other type monitoring can include keystroke and mouse detection to determine actual operator decisions. These can include inferences or statistical analysis to determine probabilistically what the operator's intentions were during different portions of the production process (e.g., employ user models to determine if operator performed procedure correctly). Other types of monitoring can include process monitoring at 524. This type monitoring includes monitoring program and/or recipe variables or other data to determine if the operator has performed according to predetermined guidelines (e.g., monitor number of times process has been cycled to determine operator efficiency). Still yet other types of monitoring include performing actual hardware manipulations to demonstrate correct training or instruction has occurred. For example, this can include testing sensors or other machinery (e.g., outputting voltages, inputting analog data, comparing control or feedback variables to expected values) to determine if manual actions taken have resulted in the proper end state of the process equipment.

Other automated quality checks can include querying or performing automated questioning at 530 (e.g., provide series of electronic questions to operator via user interface and have operator answer questions via voice, keyboard, or mouse). Another quality check 514 includes having the operator perform a trial production run 534 and monitoring production performance, selected process variables, and/or monitoring via the other quality checks that have been described herein. At 540, the training can be provided with various software or hardware simulation packages to determine if the training has been adequately received or understood by the operator.

To determine how the operator reacts during the verification phase, a feedback component 550 monitors the operator's response to the quality checks and generates one or more verified data items indicative of the response or parameters measured during quality assessments. The verified data items 560 can then be sent to a logging component to facilitate report generation and compliance of applicable regulations.

FIG. 6 is a system 600 illustrating logging and report generation in accordance with an aspect of the present invention. Verified data items 610 described above can be collected or aggregated by a data-logging component 620. This can include substantially any software or hardware component such as an SQL server that receives and records the verified items in a database 624. As illustrated, such items can be collected from a network 630 such as local factory networks and/or via public networks such as the Internet. The collected items can then be arranged in the database 624 to perform quality checking and controls such as in the form of quality reports 640 or tracking reports 650 that indicate whether process operators have been suitably trained and the type of progress that has resulted over time in view of the automated training described above. These reports can be generated and provided to regulatory agencies to automatically demonstrate conformance to applicable quality standards for automated manufacturing processes.

Figure 7:
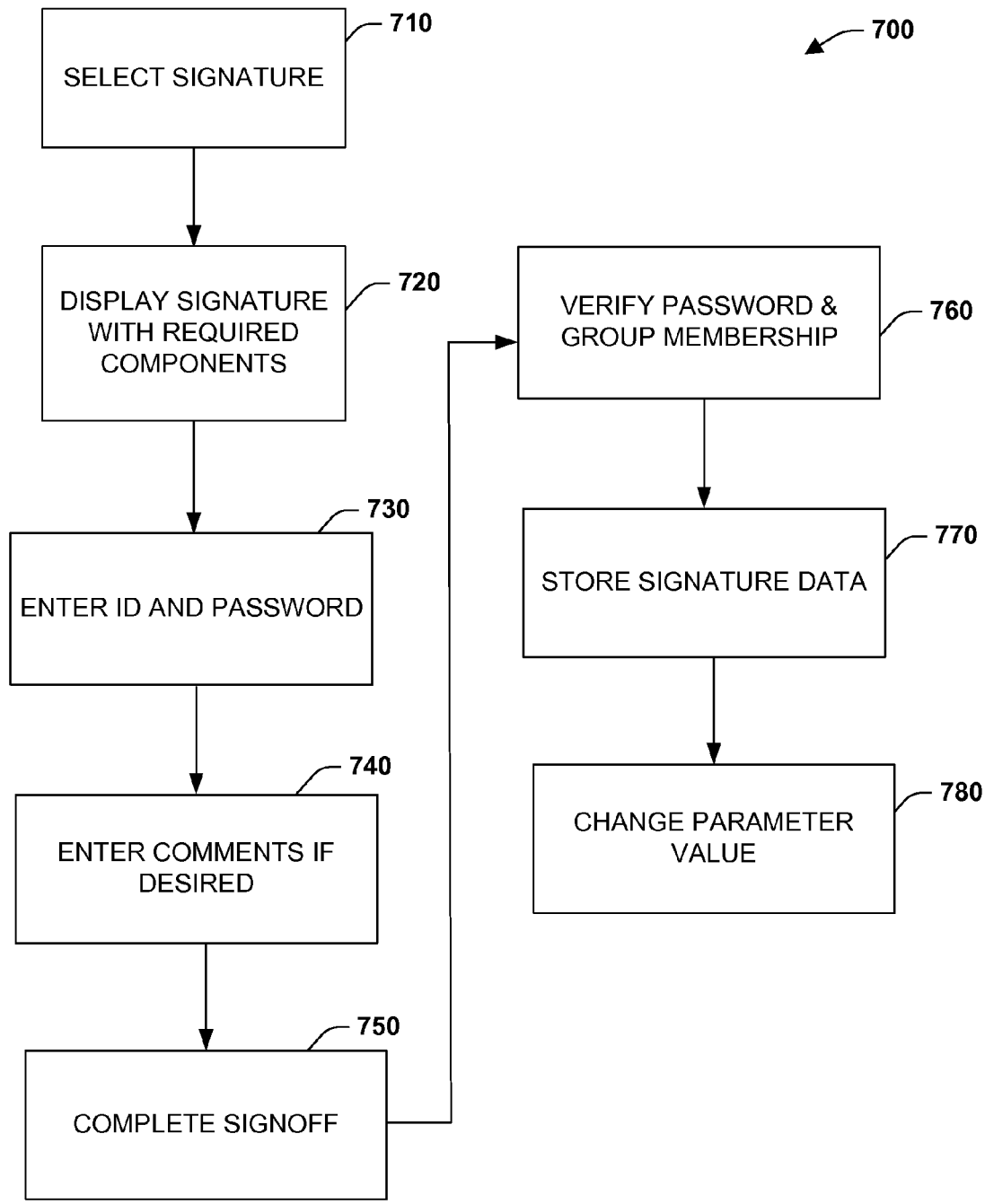
FIG. 7 is a diagram illustrating a user interface for entering binding preferences in accordance with an aspect of the subject invention.

FIGS. 7 and 8 illustrate example processes 700 and 800 for signature processing in accordance with an aspect of the subject invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

Turning to FIG. 7, a process 700 illustrates an example single-user signature procedure in accordance with an aspect of the subject invention. Although a single user scenario is described with respect to FIG. 7, and a dual user scenario is described with respect to FIG. 8, it is to be appreciated that a plurality of such users can have their signatures validated before proceeding with a respective process act. The process 700 describes an example, whereby a user has changed a parameter value whose verification policy requires a single signature. At 710, a user selects a signature from a Signature List user interface. At 720, the user interface displays a single signature with required group, signoff meaning, a location for a comment, and information about the parameter—name, value, limit and limit type (if necessary). At 730, a user enters user ID and password. It is to be appreciated that other types of data may be entered such as biometric information relating to the identity of the user. At 740, the user enters a comment—if desired or required and completes the signoff at 750 (e.g., selecting an OK button on a user interface). At 760, the batch server verifies password and group membership as correct, wherein the batch server journals signature data including full name, signature meaning, time and date, comment and the parameter the signature refers to at 770. After the signature has been validated and data stored, the parameter value is changed at 780.

It is noted that other procedures can be provided in accordance with the subject invention. For instance, users can cancel signatures before completing all signature validation requirements. This can include a command for a batch/phase to be re-enabled and the cancellation to be journaled. In some cases the user hides a signature, wherein a signature form is hidden, but remains on a signature list to be chosen at a later time. In another case, such as if verification fails—e.g., user not in required group, password incorrect, the user interface control displays an error message to the user and the batch server logs the error.

Referring now to FIG. 8, a process 800 illustrates an example where a user has changed a parameter value whose verification policy requires a dual signature. At 810, a first user selects a signature from a signature list. At 820, the user interface displays a dual signature with required groups, signoff meanings, a place for a comment for each user, and information about the parameter—name, value, limit and limit type (if necessary). At 830, a first user enters a user ID and password. At 834, if required or (desired and permitted), the first user enters a comment. At 840, the first user completes signoff and the batch server verifies password and group membership as correct at 844. At 850, a batch server or other processor journals signature data including the first user's full name, signature meaning, time and date, comment and the parameter the signature refers to. At 854, completed signoff data is displayed in the signature.

Beginning at 860, a second user enters a user ID and password, and if required or (desired and permitted), the second user enters a comment at 864. It is noted that the second user can be at a different physical/network location than the first user or at the same physical/network location. At 870, the second user completes signoff and the batch server verifies password and group membership as correct at 874. At 880, a batch server journals signature data including the second user's full name, signature meaning, time and date, comment and the parameter the signature refers to. At 884, the parameter value is changed after both signatures have been obtained, verified, and stored. It is to be appreciated that the process depicted in the process 800 detailing signature generation and collection for two users can readily be applied to a plurality of users, if desired.

As noted above, other procedure can be invoked when users cancel signatures such as re-enabling a batch/phase command and logging the cancellation in an electronic journal. If a user accesses a signature after a signoff first sign-off has been completed the user interface displays data entered for the first signoff. If a user tries to complete a signoff, and it has already been completed on a different workstation, the user interface displays an error message to the user, the attempt is journaled, and the completed signoff is displayed. If the system has been configured so the first signoff must be completed before the second, and if a second user attempts signature before a first signature is complete, the View/ActiveX control can prevent the second user from entering signature data.

What have been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method, comprising:
   determining, at a server, whether a modification to a parameter associated with a batch process causes the parameter to satisfy a condition;
   implementing, at the server, the modification in response to determining that the modification does not satisfy the condition; and
   requesting, by the server, an electronic signature from a remote location in response to the modification satisfying a function of a threshold and executing the batch process, at the server, without the modification at least until the electronic signature is received.

2. The method of claim 1, further comprising receiving, at the server, a request for the modification to the parameter.

3. The method of claim 1, wherein the determining further comprises communicating, by the server, with a data store that stores the condition and determining, at the server, whether the modification satisfies the condition.

4. The method of claim 1, wherein the requesting further comprises requesting, by the server, a second electronic signature from a second remote location.

5. The method of claim 1, further comprising implementing, by the server, the modification in response to receiving the electronic signature.

6. The method of claim 1, further comprising cancelling, by the server, the modification.

7. The method of claim 1, further comprising initiating, by the server, an automated training procedure in accordance with the modification.

8. The method of claim 1, further comprising logging, at the server, the modification.

9. An apparatus, comprising:
   a memory that stores computer-executable components, comprising:
      a verification component configured to retrieve a signature policy from a data store and determine whether a modification of a parameter of an industrial batch process causes the parameter to satisfy a condition defined by the signature policy;
      a process control component configured to:
         implement the modification in response to determination that the modification has not caused the parameter to satisfy the condition; and
         require an electronic signature before an implementation of the modification in response to determination that the modification has caused the parameter to satisfy the condition; and
      a signature component configured to verify the electronic signature before the process control component implements the modification; and
   a processor that facilitates execution of at least one of the computer-executable components.

10. The apparatus of claim 9, wherein the process control component is configured to facilitate execution of the process with the modification in response to the modification not causing the parameter to satisfy the condition.

11. The apparatus of claim 9, wherein the process control component is configured to facilitate execution of the process without the modification in response to the modification causing the parameter to satisfy the condition.

12. The apparatus of claim 9, further comprising a logging component configured to record the modification.

13. The apparatus of claim 9, wherein the modification requires two electronic signatures from disparate locations.

14. The apparatus of claim 9, wherein the apparatus is a batch server.

15. The apparatus of claim 9, wherein the electronic signature comprises a username and a password.

16. The apparatus of claim 15, wherein the electronic signature comprises signoff data and a timestamp.

17. The apparatus of claim 9, wherein the electronic signature component is configured to enforce a signature policy.

18. The apparatus of claim 9, further comprising a training component associated with the signature component or the verification component configured to implement a training procedure upon receipt of the electronic signature.

19. A system, comprising:
a memory that stores computer-executable components, comprising:
a verification component that determines whether a modification of a parameter of an industrial batch process causes the parameter to meet a condition of a function defined by a signature policy, wherein the condition comprises a threshold for the parameter; and
a signature component that requests an electronic signature according to the signature policy in response to the modification causing the parameter to meet the condition; and
a processor that facilitates execution of at least one of the computer-executable components.

20. The system of claim 19, wherein the signature component permits the modification without an electronic signature in response to the parameter not meeting the condition.

21. The system of claim 19, further comprising a process control component that implements the modification.

22. The system of claim 21, wherein the process control component foregoes implementation of the modification until the electronic signature is received in response to the parameter meeting the condition.

23. The system of claim 19, further comprising a logging component that records the modification.

24. The system of claim 19, wherein the signature policy requires two signatures.

25. The system of claim 24, wherein the signature policy mandates the two signatures to be from two different locations.

26. A computer readable storage medium having stored thereon computer executable instructions for performing operations, the operations comprising:
determining whether a modification to a parameter associated with a batch process exceeds a threshold value for the parameter defined by a signature policy stored in a data store;
implementing the modification in response to the modification not exceeding the threshold; and
requesting an electronic signature from a remote location in response to the modification exceeding the threshold and executing the process without the modification until the electronic signature is received.

* * * * *